Dec. 8, 1942. A. J. CHESSON 2,304,626
WATER TREATING APPARATUS
Filed Dec. 17, 1940
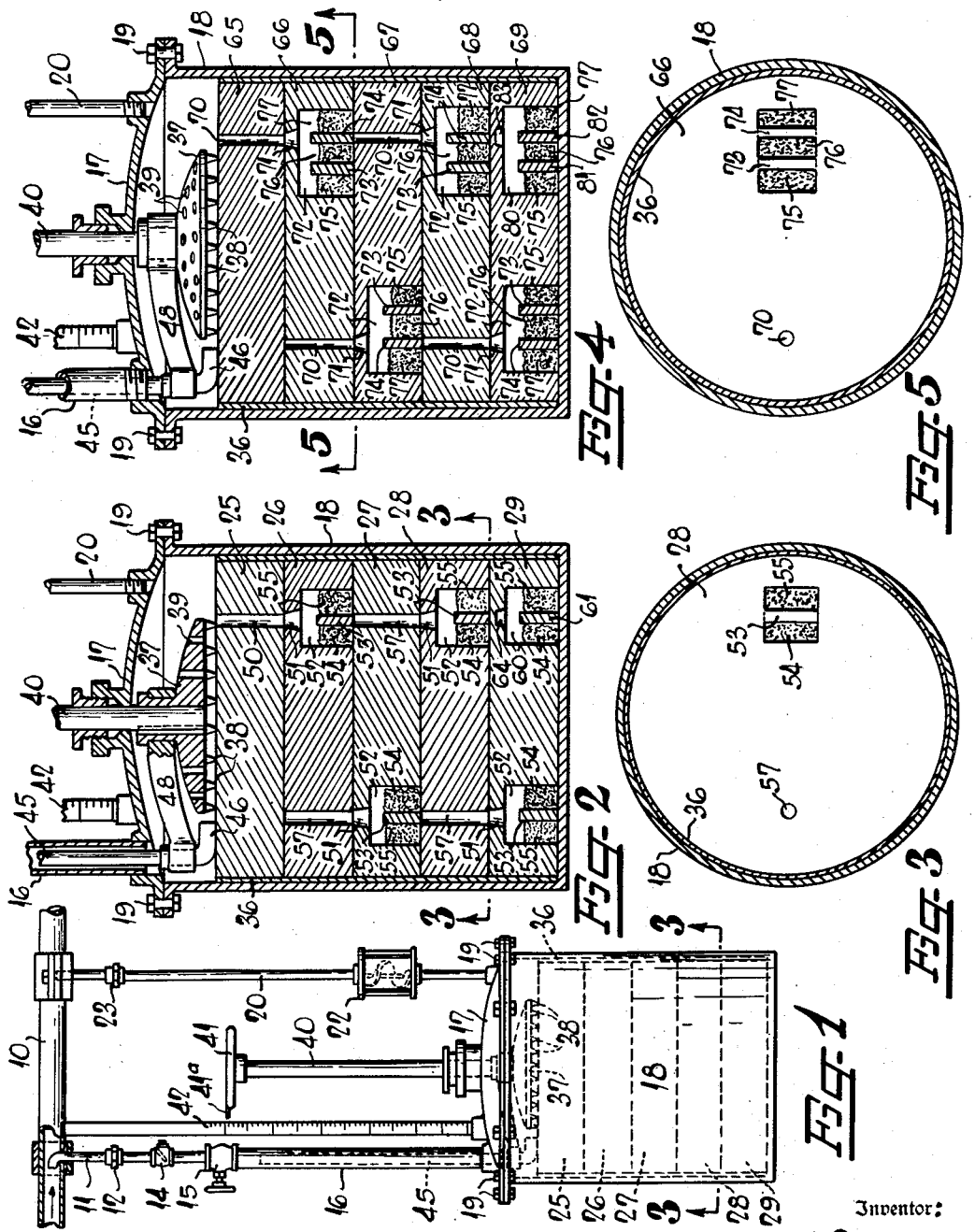
Inventor:
ANDREW J. CHESSON
By
Eaton + Brown
Attorneys Patented Dec. 8, 1942

2,304,626

UNITED STATES PATENT OFFICE 2,304,626

WATER TREATING APPARATUS

Andrew J. Chesson, Miami, Fla.

Application December 17, 1940, Serial No. 370,506

1 Claim. (Cl. 210—38)

This invention relates to an apparatus for treating water and forms a continuation in part of my co-pending patent application, Serial Number 202,921, filed April 18, 1938.

I have found that water can be more effectively treated by providing a by-pass from the water main which will direct a certain percentage of the total flow over solidified cakes of chemical treating compound. These cakes are placed in a closed container having an inlet and an outlet by-pass pipe piercing opposite sides of the top. When the container is filled with cakes of treating compound, the water will flow immediately over the top cake from the inlet to the outlet pipe, giving a washing effect to the top of the uppermost cake. However, as cakes are absorbed from the top, a greater space will be disposed above the top of the uppermost cake, therefore, the outlet of the incoming pipe will be disposed so far above the chemicals that the flow will be dissipated in the water therebetween, thus preventing the top cake from being washed by the incoming water. It is very desirable to have this cake constantly washed by the incoming water, because there is a tendency for sedimentation in the water to settle on the top of the uppermost cake and prevent the chemicals therein from becoming readily accessible to the water as it passes thereover.

It is, therefore, an object of this invention to provide a closed casing with a plurality of chemical cakes therein, said casing having an inlet by-pass pipe communicating with one side of the top and also having an outlet by-pass pipe communicating with the other side of the top with a telescopic pipe slidably disposed within said inlet pipe and having its outlet end resting upon the uppermost cake so that as the cake is consumed, the telescopic pipe will move downwardly and keep in contact with the upper side thereof. In the present embodiment of the invention, a scarifier is provided which has means associated therewith for normally keeping the lower end of this pipe in contact with the uppermost cake. This scarifier also rests on the top of the uppermost cake and by virtue of its weight it is caused to move downwardly in contact with the upper surface of the cake as the same is washed away and at the same time the telescopic pipe is carried downwardly along with it.

A further object of this invention is to provide an apparatus for treating water of the class described comprising a container having an inlet pipe and an outlet pipe disposed on opposed edges of the top side of said container, said container having a plurality of cakes of material therein and each cake having compartments therein in which various chemicals are placed in separate units.

Some of the objects of the invention having been stated, other objects will appear as the description proceeds, when taken in connection with the accompanying drawing, in which—

Figure 1 is an elevation of a water treating apparatus;

Figure 2 is an enlarged sectional view taken through the lower portion of Figure 1;

Figure 3 is a sectional view taken along the lines 3—3 in Figures 1 and 2;

Figure 4 is an enlarged sectional view similar to Figure 2 but showing a slightly modified form of the cake structure disposed within the casing;

Figure 5 is a sectional plan view taken along the line 5—5 in Figure 4.

Referring more specifically to the drawing, the numeral 10 denotes a water supply main through which water is adapted to flow from any suitable source such as a reservoir to a dispensing point such as a spigot. Disposed in this pipe is the upper end of a Pitot tube 11, the open end of which is directed against the flow of the water in the main 10. This tube 11 has a union 12 and a check valve 14 installed therein and the lower end of this tube is connected to a suitable hand valve 15. Leading from the lower side of the hand valve 15 is a larger pipe 16 and its lower end is threadably secured in cap 17, said cap being secured to the upper side of a container 18 by any suitable means such as bolts 19. Leading from the cover 17 and at substantially 180 degrees from the pipe 16 is an outlet pipe 20, the upper end of which communicates with the water main 10. This pipe 20 has installed therein a suitable visualizer 22 and a union 23.

The water travels through the main 10 from left to right (Figure 1) and a portion thereof is directed downwardly through Pitot tube 11. It is seen that this tube is bent on the interior of the main 10 so that a portion of the flow will be by-passed. The water then flows downwardly through pipe 16 into the casing 18 and from this casing it moves upwardly through pipe 20 and back into the main 10.

The casing 18 has disposed therein suitable cakes of chemical compound. These cakes are designated by the reference characters 25, 26, 27, 28 and 29. Any suitable composition of materials may be employed in the cake of softening material, such as the mixture of colloidal clay, sodium silicate, soda ash and borax. Another suitable composition may comprise crystallized trisodium phosphate, 95 parts, and sodium metasilicate, pentahydrate 17 parts. These cakes are placed in the casing, leaving a crack about half an inch wide between the outer periphery of the cakes and the interior surface of the casing. Then a mixture of 90 percent trisodium phosphate and 10 percent metasodium silicate is poured into this crack, thereby forming a seal 36 between the various cakes and to hold the cakes in proper position and in spaced relation from the interior of the container.

The uppermost cake is adapted to have rest thereon a suitable scarifier 37. This scarifier has teeth 38 in the lower face thereof which engage the top side of the upper cake 25. Also disposed in scarifier 37 are a plurality of vertically disposed holes 39 to allow water to circulate downwardly through this member and onto the top surface of the upper cake 25 and thereby assist in preventing sedimentation from collecting on the top side. The scarifier 37 is fixedly keyed upon a vertical shaft 40, said shaft being rotatably mounted in the central portion of the cover 17 and having a wheel 41 secured to the upper end thereof, so that the entire scarifying unit may be rotated to roughen the upper surface of the upper cake. Integral with this wheel 41 is a pointer 41a which is disposed adjacent a suitable gauge 42 having a suitable scale thereon to indicate the amount of chemical compound disposed within the casing therebelow.

In order to insure that the water will always enter the casing 18 at a point immediately above the uppermost cake of chemical compound, a suitable pipe 45 has been telescopically mounted within pipe 16. The lower end of this pipe is bent inwardly as at 46 and is adapted to rest immediately above the top cake. The pipe 45 has an arm 48 secured around its lower end directly above the bent portion and this arm has its other end rotatably mounted around the upper portion of scarifier 37. As the cakes are absorbed by the water which passes inwardly through the pipe 46 and outwardly through pipe 20, the scarifier will move downwardly by virtue of its own weight. At the same time, the pipe 45 will be caused to move downwardly since the arm 48 makes this pipe an integral part of the scarifier. It is seen by observing Figure 2 that this pipe is so disposed that the flow of the incoming water will be directed against the upper surface of the uppermost cake of chemical compound, and since the flow is in such close proximity to the top of the cake, the scarifier 37 will be assisted materially in preventing sedimentation from collecting on top of the uppermost cake.

The top cake has a hole 50 extending vertically therethrough and this hole is adapted to communicate with a frustro-conical hole 51, in the upper portion of the cake 26, said conically disposed bore, in turn, communicating with a compartment 52 which has a partition 53 dividing the same. This partition extends about three-quarters the depth of the compartment 52 and is adapted to have a suitable treating compound such as powdered borax 54 disposed on one side and flake soap 55 disposed on the other side. The water which passes over the uppermost cake will have access to this flake soap and powdered borax through the bore 50.

The cake 26 also has a vertically disposed bore 57 disposed therethrough and this bore communicates with the conically disposed bore 51 in the next lowermost cake 27. Cakes 26, 27 and 28 are identical in all respects, hence like reference characters will apply. It will be noted, however, that the partitions 53 have their lower ends disposed directly above the bores 57 in cakes 27 and 28, thereby preventing any water from gaining access to the lowermost cakes until after the partition has been completely washed away. The lowermost cake 29 in the bottom of the container likewise has a compartment 52 with a partition 53 therein, but this cake does not have a vertically disposed bore 57. Instead, a compartment 60 is provided having a partition 61 disposed therein extending substantially three-quarters of the height of the compartment. As in the superposed cakes, powdered borax 54 is disposed on one side and flake soap 55 is disposed on the other side of the partition. Communicating with the upper portion of the compartment 60 is a restricted bore 64. This bore does not extend to the top of the cake 29, but a thin portion of the cake closes the upper portion of this hole. When the lowermost cake has been partially washed away, the opening 64 will be opened, thereby making the flake soap and the powdered borax in compartment 60 accessible to the water.

Figures 4 and 5 show a slightly modified form of the invention which is identical to the preceding form except the cake structure is slightly different. In this form suitable cakes 65, 66, 67, 68 and 69 are provided and all of these cakes are identical except the top and bottom cakes 65 and 69. Metasodium silicate is sometimes mixed in these cakes for boiler use to eliminate rust. The top cake 65 has a vertically disposed bore 70 therein, which extends the entire depth of the cake. The lower end of this bore is adapted to communicate with conical bore 71 and compartment 72 in the adjacent cake 66, this compartment being separated by partitions 73 and 74, thereby forming three receptacles. One of these receptacles contains borax 75, another contains soap 76 and the other contains a sterilizing or other agency 77 such as caustic soda, tannic acid or soda ash. Instead of the above-named compounds, any suitable water treating agency may be used in the receptacles to condition the water for a particular use. For example, metasodium silicate may be used in a receptacle where the water is to be treated for boiler use. The water which passes over the top of the uppermost cake 65 also flows down into the bore 70 and into compartment 72 to absorb portions of the treating agencies 75, 76 and 77. The lower portion of the partition 74 rests directly upon the top of the bore 70 in the next lowermost adjacent cake 67 thereby closing the same. Therefore, it is seen that the compound in the cake 67 is not contacted by the water until all of the first cake 65 has been used. At that time, the water will be allowed to seep downwardly through bore 70 in cake 66 from whence it will come in contact with the chemicals 75, 76, and 77 the cake 67. When the cake 66 has been completely washed away then the partition 74 will have been dissolved to open bore 70 in the next lowermost cake 67 to thereby bring the compounds 75, 76 and 77 in the cake 68 in contact with the water which flows at this time above the cake 67. As in the preceding case, the cakes 65 to 69 are sealed within the casing 18 by a mixture of 90 per cent trisodium phosphate and 10 per cent metasodium silicate, which is poured between the exterior periphery of the cakes and the interior periphery of the casing thereby forming a sealed joint 36.

The lowermost cake 69 also has a compartment 80 separated by partitions 81 and 82. A frustro-conical bore 83 communicates with the top of compartment 80. A small portion of cake 69 separates the upper portion of bore 83 from the top of the cake. After all the cakes have been washed away except the bottom cake 69 and after this cake has been used for a short time the compounds in compartment 80 will be brought in contact with the water thereabove. The uppermost cake 65 does not have a compartment 72 or 80 therein.

In the drawing and specification, there has been set forth a preferred embodiment of the invention and although specific terms are employed, they are used in a generic and descriptive sense only and not for the purpose of limitation, the scope of the invention being set forth in the appended claim.

I claim:

A cake of water softening material adapted to be placed in a container, said cake comprising a plurality of superposed layers of water softening material, the lowermost layer having a pair of cavities therein for reception of additional water treating material, one of the cavities communicating with the upper surface of the lowermost layer, the intermediate layers each having a cavity for reception of water treating materials and communicating with the upper surface of the layer and also having a hole therethrough communicating with a cavity in the subjacent layer, the topmost layer having a hole therethrough communicating with the cavity in the subjacent layer, whereby water entering and leaving the top of the container will gradually and progressively wash away the layers while at the same time having contact with the cavity in the next subjacent layer to dissolve the treating materials in the cavity in the subjacent layer.

ANDREW J. CHESSON.